United States Patent [19]

Wächter et al.

[11] 4,038,595

[45] July 26, 1977

[54] SELF-EXITED HIGH-FREQUENCY GENERATOR

[75] Inventors: Herbert Wächter; Hans-Joachim Gronemann, both of Erlangen, Germany

[73] Assignee: Siemens Aktiengesellschaft, Munich, Germany

[21] Appl. No.: 553,111

[22] Filed: Feb. 26, 1975

[30] Foreign Application Priority Data

Mar. 20, 1974 Germany ............................ 2413508

[51] Int. Cl.$^{2}$ ........................ H02P 13/10; G05F 7/00

[52] U.S. Cl. ........................................ 323/45; 323/52; 331/181; 333/32

[58] Field of Search ........................ 331/181, 169–171; 323/51, 52, 90, 45, 46, 47; 333/32

[56] References Cited

U.S. PATENT DOCUMENTS

| | | | |
|---|---|---|---|
| 2,210,303 | 8/1940 | Polydoroff | 331/169 X |
| 2,453,529 | 11/1948 | Mittelmann | 323/52 UX |
| 2,697,165 | 12/1954 | Blossey | 331/181 X |
| 3,384,884 | 5/1968 | Var | 323/51 X |
| 3,719,902 | 3/1973 | Esterly | 331/181 X |
| 3,735,244 | 5/1973 | Gumtau et al. | 323/51 |

FOREIGN PATENT DOCUMENTS

| | | | |
|---|---|---|---|
| 1,245,149 | 12/1959 | France | 331/169 |

*Primary Examiner*—Gerald Goldberg
*Attorney, Agent, or Firm*—Kenyon & Kenyon, Reilly, Carr & Chapin

[57] ABSTRACT

A self exited frequency generator including a parallel resonant circuit with the inductive portion of the resonant circuit comprising a high frequency current transformer in which, in order to match the load with the oscillator tube a slidable ferrite core is inserted into the interior of the primary coil of the high frequency current transformer thereby alleviating the need for adjustable taps on the primary coil.

1 Claim, 7 Drawing Figures

SELF-EXITED HIGH-FREQUENCY GENERATOR

BACKGROUND OF THE INVENTION

This invention relates to self exited high frequency generators in general and more particularly to an improved self exited high frequency generator of the type utilizing an oscillator tube and parallel resonant circuit with a high frequency current transformer forming a portion of the resonant circuit.

High frequency generators of the type made up of an oscillator tube and a parallel resonant circuit with a high frequency transformer in the resonant circuit for coupling the generator output to a load are known. Typically, a high frequency current transformer which does not have an iron core is used, as disclosed in German Pat. No. 1,177,702. In arrangement disclosed therein a slider arm with a contact head sliding along the primary coil and continually adjustable under load is installed within the main magnetic field generated by the transformer. This contact or adjustable tap is used as one of the two terminals of the resonant circuit. By means of adjusting the tap, a continuous matching of the high frequency generator to the load with constant good coupling and high efficiency is obtained. Although this method of matching has shown good results in practical operation, problems are encountered with regard to the physical construction of the adjustable slider arm along with the contact which slides along the primary coil and with regard to the voltage stressing of the capacitor in the resonant circuit. The capacitor, depending on the match, can have a voltage thereon which changes by a factor of two ore more.

In German Offenlegunsschrift No. 2,263,675 a high frequency transformer for an induction heating installation having a primary and a secondary winding is disclosed. In the disclosed arrangement both windings are essentially cylindrical in form and located on a common central axis. The coils are retained relative to each other in a telescopic coaxial arrangement surrounding an open central chamber. Within the central chamber a core having an outer layer of high permeability material is placed. The length of the core is essentially equal to that of the coil. To vary the output power induced in the secondary coil, the core is mounted for movement in the axial direction of the coil. This previously developed arrangement has as its primary disadvantage that, with the moving of the core, a variation in frequency takes place.

In view of these difficulties with the prior art arrangements, it can be seen that there is a need for a high frequency generator of simple physical construction which avoids the above described disadvantages and permits a continuous matching of the load and the oscillator tube.

SUMMARY OF THE INVENTION

The present invention provides such a high frequency generator. It includes a high frequency current transformer having a secondary winding which is coupled to the load and a primary winding supplied from a fixed tap towards the oscillator output is coupled. To provide the necessary adjustments for matching the load to the oscillator tube, means which are movable within the interior of the primary coil in the vicinity of the tap are provided. These means which are movable in the axial direction of the coil and which affect the mutual inductance between the two coils have an effective length which is considerably shorter than the length of the primary coil.

Preferably, the means used to vary the inductance will be a core made of high permeability material such as ferrite which increases the inductance. It is particularly advantageous if the ferrite core has a length in the range of between a quarter and a half of the length of the primary coil. Rather than using such a core which increases the inductance, a device which reduces the inductance, such as a shorting ring or a displacement body may also be used.

The high frequency generator constructed in accordance with the present invention permits continuous and contactless matching of the load and the oscillator tube even during operation with negligently small variations of the frequency through a change of the coupling through a comparatively small voltage transformation. The voltage transformation occurs because the generator supply to the primary coil is not coupled at its two end but through a tap. The voltage transformation can, however, for the same matching range be kept considerably smaller, since in addition, the change in coupling is being utilized. Because of the fixed connection of the tap with primary coil, problems are eliminated which are associated with a sliding contact. For example, problems in such a device such as contact making, cooling, and extreme accuracy as to size are eliminated. The change in coupling is accomplished solely by the means within the coil center and movable in the axial direction. As noted, a ferrite core is preferred, the movement of which will change the ratio of the partial inductances to each other. However, the overall inductance of the resonant circuit and the frequency will be maintained essentially constant.

In accordance with the further embodiment of the invention a high frequency current transformer with only a single coil providing both primary and secondary, i.e., an auto transformer, and with the load connected directly between one or more turns of the coil is shown. In this embodiment also, in the interior of the coil, in the vicinity of the inductor connection, a core made of high permeability material such as ferrite is arranged. The ferrite core is axially movable to obtain the necessary adjustment. As with the previously described embodiment a short circuit ring may also be used. In each case the means inside the coil will have effective length considerably shorter than the length of the coil. It is preferred that the load connection be made in the end section of the winding. The load can be connected to the turns in the coil using connecting members positioned in the plane of the winding. A typical example of the type of load which might be used in an arrangement such as this is shown in the form an inductive load used in a device for inductive heating of a work piece.

With this second embodiment of the invention, coupling is improved by the core made of high permeability material inside the coil such that a secondary coil is not needed. The matching of the load to the internal resistance of the oscillator tube thus takes place through changing the coupling and the partial voltages at the partial inductances through the use of the movable core. In addition, it is possible to make an additional voltage transformation by feeding the coil through a tap which is permanently connected to it.

The second embodiment of the invention has a considerably simplified physical construction and thus an associated compact design.

DETAILED DESCRIPTION OF THE PREFERRED EMBODIMENT

Figure 1:
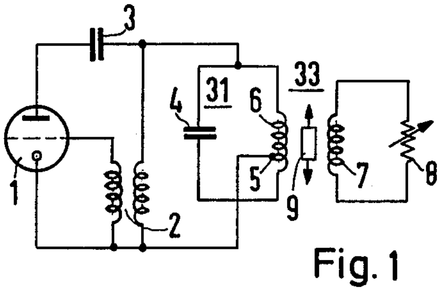
FIG. 1 is a circuit diagram of a first embodiment of the high frequency generator of the present invention with a high frequency current transformer having primary and secondary windings.

FIG. 1 is a circuit diagram illustrating a first embodiment of the present invention. Shown is a triode 1 which is the oscillator tube. A feedback transformer 2 is provided with its primary coupled through a blocking capacitor 3 across the plate and cathode of the tube 1 with the secondary of transformer 2 connected between the grid and cathode. The output of the oscillator tube 1 is also coupled to a tank circuit 31 having as its elements the capacitor 4 and the primary winding 6 of a high frequency current transformer 33. The oscillator tube output is connected across one end of the primary 6 and a tap 5 on that primary. Capacitor 4 is coupled across the two end terminals of primary 6. Current transformer 33 also includes a secondary winding 7 for coupling the output of the generator to a load 8 shown as a variable resistor. Although, so shown, it will be recognized that the load may equally well be inductive or partially resistive and partially inductive. Inside the primary coil 6, in the area of tap 5, a ferrite core 9 movable in the axial direction of the coil is installed. Matching is made possible partially through the voltage transformation which takes place through feeding the primary winding through the tap 5. Additional matching is accomplished, however through a change of coupling by means of the ferrite core 9 which is movable in the vicinity of the tap 5. Through this arrangement it is possible to use a permanent tap 5 rather than a sliding tap as was done in the prior art. As a result adjustment for purposes of matching will not result in an excessive voltage being placed across the capacitor 4.

Figure 2:
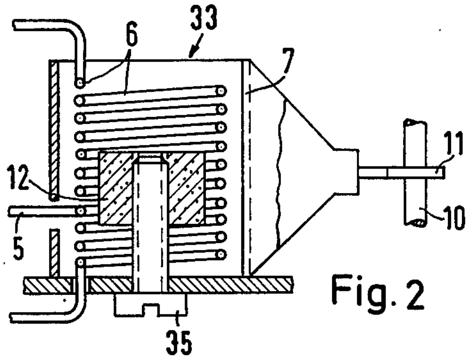
FIG. 2 is a longitudinal cross-section through the high frequency current transformer of the circuit of FIG. 1.
Figure 3:
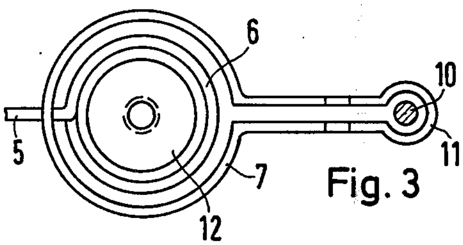
FIG. 3 is a transverse cross-section through the high frequency current transformer of FIG. 2.

FIGS. 2 and 3 show in longitudinal and transverse cross-sections respectively the transformer 33 of FIG. 1. The primary winding 6 is in the form of a cylindrical coil and is encompassed by a secondary winding 7 in the form of a sleeve. The primary winding 6 and secondary winding 7 are mounted rigidly so that they cannot move with respect to each other. The secondary 7 is shown as being coupled to provide for the inductive heating of a work piece 10. For this purpose, the load then comprises an inductor 11 which is connected to the sleeve 7. As described above, the intermediate tap 5 is connected solidly to the primary winding near the lower portion thereof. It can be connected for example by hard soldering. Disposed with the primary winding 6 is a ferrite core 12 adjustable by means of a screw 35 in a manner well known in the art. As illustrated, the core is located in the area of the tap 5 and is axially movable in the direction of the coil axis. The ferrite core 12 will preferably have a length which is in the range between one-half and one-quarter of the axial length of the primary winding 6. It is mounted so that its movement is restricted to the extent that it always stays within the confines of the primary winding 6.

Figure 4:
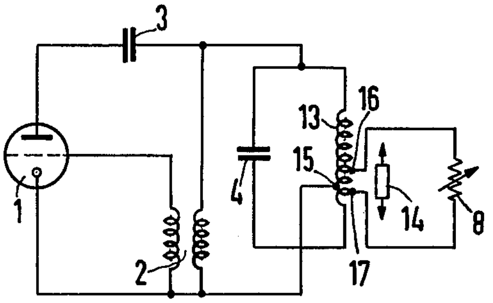
FIG. 4 is a circuit diagram of a second embodiment of the present invention in which only a single current transformer winding is used.

FIG. 4 is a schematic diagram of a second embodiment of the present invention utilizing only a single current transformer winding. In all respects other than this it is identical to the circuit of FIG. 1 with the connection of the oscillator tube 1, feedback transformer 2, capacitor 3 and capacitor 4 being exactly as described above. In this instance, the single transformer winding is designated 13 and the tap coupling the output of the oscillator tube as 15. To obtain an output, the load 8 is coupled across one or more coils of the winding 16 by means of taps 16 and 17. Thus, a single winding forms both primary and secondary. Within the winding is disposed an adjustable ferrite core 14. This ferrite core is disposed in the area of the terminals 16 and 17 and is movable in the axial direction of the coil. Once again, this ferrite core has a length which is considerably shorter than the length of the winding 13.

Figure 5:
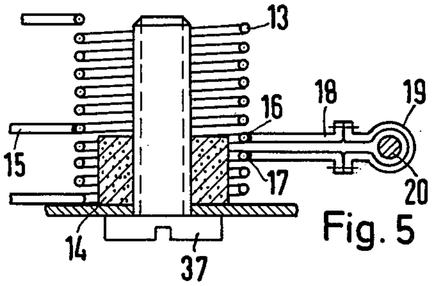
FIG. 5 is a longitudinal cross-section through the high frequency transformer of the circuit of FIG. 4.
Figure 6:
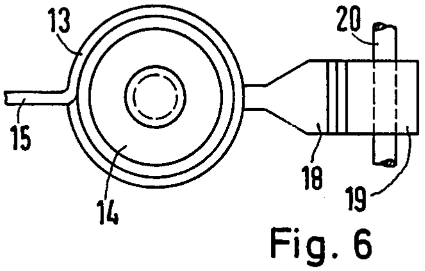
FIG. 6 is a transverse cross-section through the high frequency transformer of FIG. 5.

The physical arrangement of the high frequency transformer 13 of FIG. 4 is illustrated on FIG. 5 and FIG. 6. These are figures similar to FIGS. 2 and 3 illustrating the longitudinal and transverse cross-sections through the transformer. As illustrated, the single winding 13 has a ferrite core 14 mounted therein in the vicinity of taps 16 and 17. As illustrated, these taps 16 and 17 are connected through a connecting member or strip 18 to an inductor 19 surrounding a work piece 20 for the inductive heating thereof. Once again, the inductor 14 is mounted to a screw 37 in conventional fashion so that it can be moved upward to change the coupling. The simplicity of the connection by means of the connecting strip 18 is evident in that they can simply be located in the plane of the coils to which they are connected.

Figure 7:
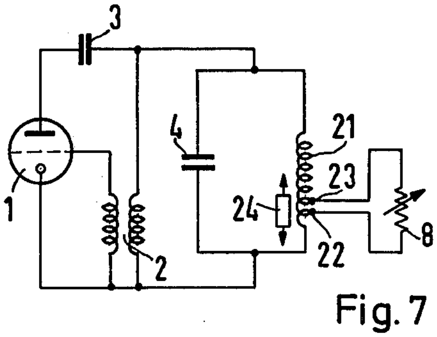
FIG. 7 is a circuit diagram of the third embodiment of the generator of the present invention utilizing only a single high frequency current transformer winding.

FIG. 7 illustrates a further embodiment of the invention utilizing a single winding high frequency current transformer. The primary difference between this embodiment and that of FIG. 4 is that the output of the generator tube 1 is connected directly across the end terminals of the single winding 21. The load 8 is coupled to terminals 22 and 23 which are permanently connected to turns near the end zone of the winding 21, much in the manner of the coupling shown in FIG. 5. Once again, a ferrite core 24 is provided inside the coil 21 and is movable in the axial direction thereof. With this embodiment a voltage transformation through the use of a tap is eliminated. Matching is accomplished solely through the variation of coupling which results through movement of the ferrite core 24 and by the ratio of partial voltages at the partial inductances. As a result the matching range of this embodiment is smaller than that of the previously described embodiment.

Thus, an improved, self-exited high frequency generator has been disclosed. Although specific embodiments have been illustrated and described, it will be obvious to those skilled in the art that various modifications may be made without departing from the spirit of the invention which is intended to be limited solely by the appended claims.

What is claimed is:

1. In a self excited high frequency generator of the type including an oscillator tube and a parallel resonant circuit and including a high frequency current transformer consisting of a single transformer winding and a axially movable core of highly permeable material of a size which is considerably shorter than the length of the winding and which is arranged wholly inside of the transformer winding, with an inductor coupled to the transformer winding as a load, the improvement comprising:

a. the load being connected directly between at least one turn of the transformer winding with terminals attached thereto near the end of said winding;
b. the oscillator tube being coupled to the transformer winding in the area of said load terminals using a rigidly connected intermediate tap; and
c. said core being disposed for axial movement only in the vicinity of the intermediate tap of said oscillator tube whereby movement of said core is restricted within the confines of the transformer winding and permits matching the oscillator tube to the load without changing the overall inductance of the transformer coil and thus without changing frequency.

* * * * *